United States Patent [19]

McMaster

[11] 4,421,482
[45] Dec. 20, 1983

[54] CONVEYOR ROLL FOR CONVEYING HEATED GLASS SHEETS

[76] Inventor: Ronald A. McMaster, 420 Water St., Woodville, Ohio 43469

[21] Appl. No.: 337,790

[22] Filed: Jan. 7, 1982

[51] Int. Cl.³ .................. B21B 31/08; F27B 9/00; F27D 3/00
[52] U.S. Cl. .................................. 432/246; 29/132; 65/374.1; 432/121; 432/236
[58] Field of Search ............. 432/121, 236, 246; 65/374.1, 106, 114, 118; 29/132

[56] References Cited

U.S. PATENT DOCUMENTS

| | | | |
|---|---|---|---|
| 2,883,172 | 4/1959 | Mitchell | 432/246 |
| 3,485,618 | 12/1963 | Ritter, Jr. | 65/106 |
| 3,806,312 | 4/1974 | McMaster et al. | 432/121 |
| 3,853,526 | 12/1974 | Hochart | 65/374.1 |
| 3,934,970 | 1/1976 | McMaster et al. | 432/121 |
| 3,947,242 | 3/1976 | McMaster et al. | 432/122 |
| 3,994,711 | 11/1976 | McMaster | 65/163 |
| 4,246,313 | 1/1981 | Stengle, Jr. | 65/374.1 |

*Primary Examiner*—John J. Camby
*Attorney, Agent, or Firm*—Brooks & Kushman

[57] ABSTRACT

A conveyor roll (20,21,20') for conveying heated glass sheets on a horizontal roller conveyor of a glass sheet processing system is disclosed as including a shaft (42,70,42) having a support (44,72,80) of aromatic polyamide fibers for engaging the conveyed glass sheets. Kevlar fibers are preferably utilized for the support (44,72,80) so as to have the requisite thermal stability and resistance to cutting by broken glass. One embodiment of the roll (20) has a helically wrapped support (44) comprising braided Kevlar rope or an outer Kevlar sleeve (64) and a central core (62) which may be longitudinally extending metallic or glass fiber strands (66) or a helical spring (68). Another embodiment of the conveyor roll (21) includes a ceramic roll shaft (70) of fused silica extending through an outer sleeve (72) of Kevlar fibers. A further embodiment of the conveyor roll (20') includes a support (80) having annular conveying discs (82) made of Kevlar fibers and spaced along the length of the shaft (42). In each roll embodiment (20,21,20') the associated Kevlar support (44,72,80) preferably has an outer surface (46,74,86) of the same diameter as drive surfaces (56) on end members (52) of the shaft.

20 Claims, 17 Drawing Figures

U.S. Patent  Dec. 20, 1983  Sheet 1 of 3  4,421,482
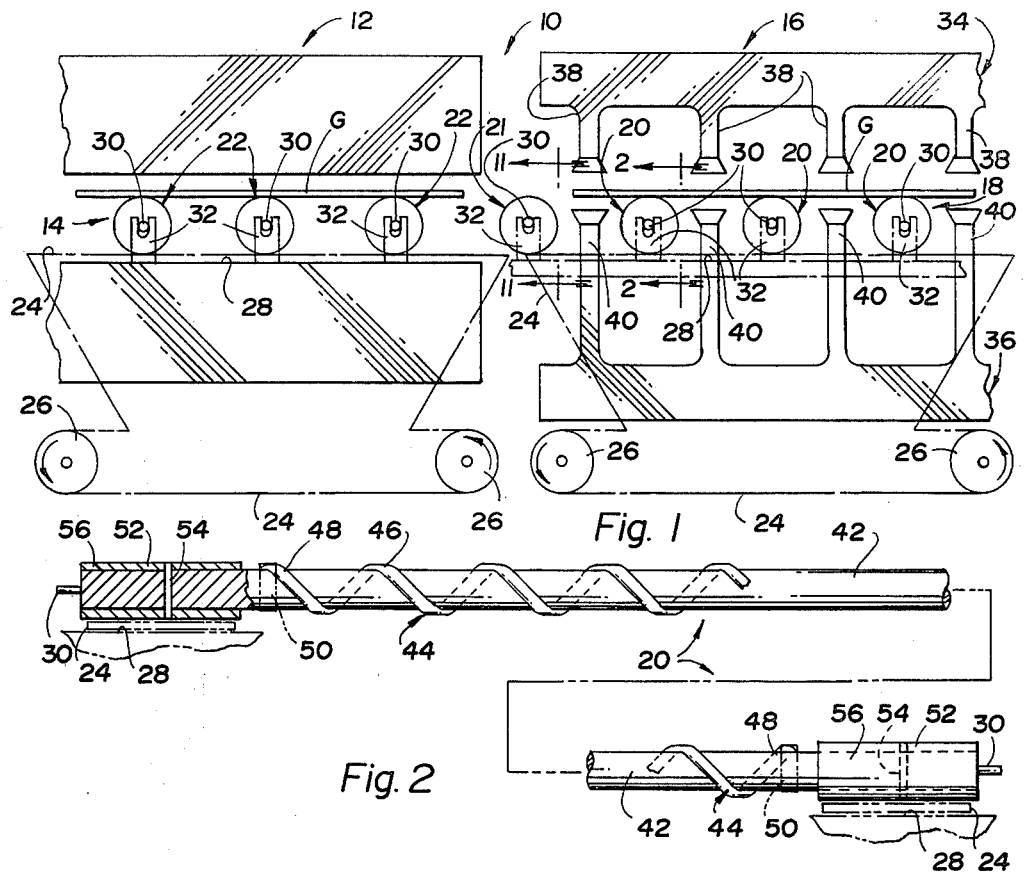
Fig. 1
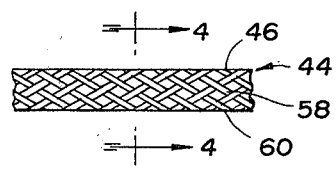
Fig. 2
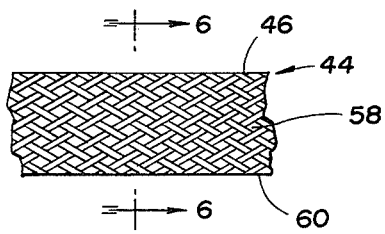
Fig. 3
Fig. 5
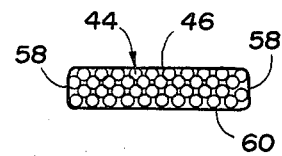
Fig. 4
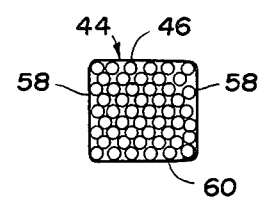
Fig. 6

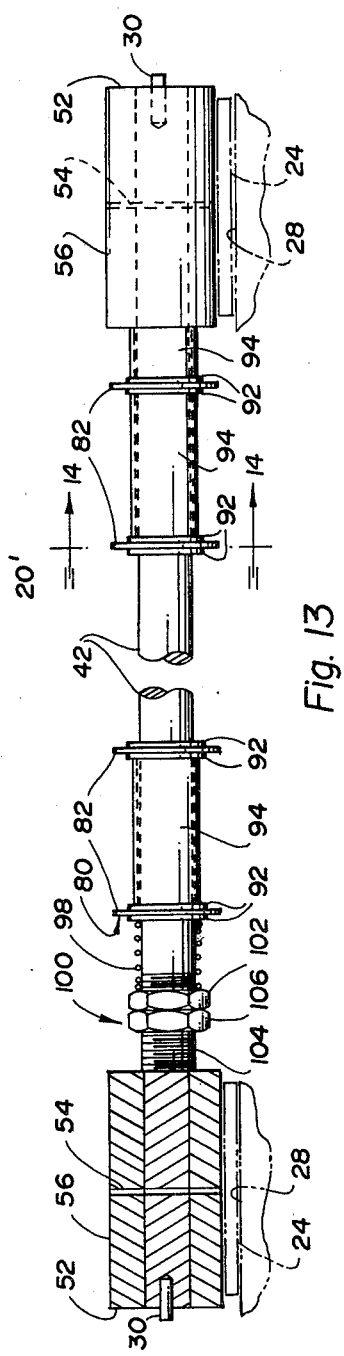
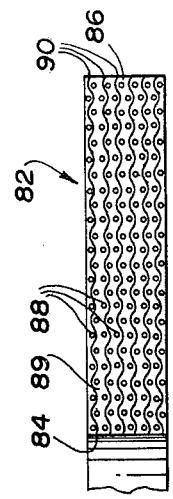
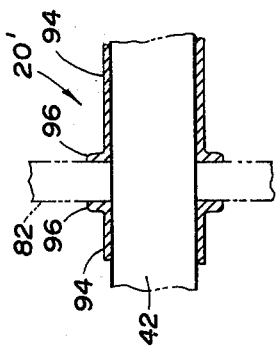
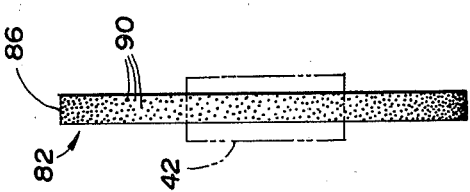
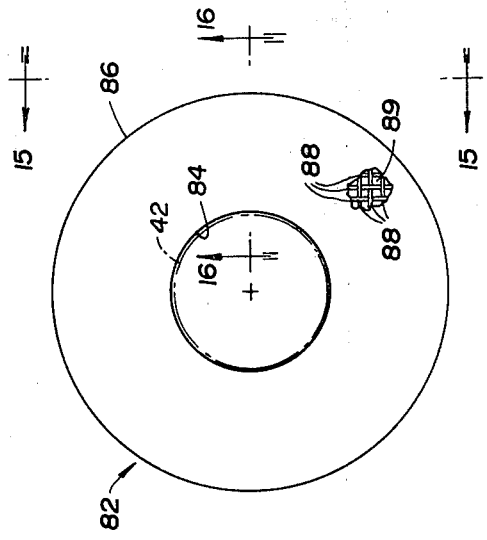

CONVEYOR ROLL FOR CONVEYING HEATED GLASS SHEETS

TECHNICAL FIELD

This invention relates to a conveyor roll for conveying heated glass sheets on a horizontal roller conveyor of a glass sheet processing system.

BACKGROUND ART

In many glass processing systems, horizontal roller conveyors are utilized to convey heated glass sheets during processing. For example, many conventional systems designed to temper and/or heat strengthen glass sheets utilize horizontal roller conveyors for conveying glass sheets first into a furnace for heating and then out of the furnace for tempering or heat strengthening. Within the furnace, it is conventional to utilize ceramic or steel rolls which are capable of withstanding a heated ambient on the order of about 1200 to 1250 degrees Fahrenheit (i.e. about 650 to 675 degrees Centigrade) for a prolonged period.

In glass sheet tempering systems utilizing roller conveyors, conveyor rolls at the exit location of the furnace receive the heated glass sheets for conveyance through a quench unit in which blasts of cooling gas are supplied to the oppositely facing glass surfaces to provide tempering of the sheets. Such tempering places the glass surfaces in compression in order to improve the mechancal properties of the glass sheets by providing greater resistance to breakage and the characteristic of breaking into small dull pieces rather than into sharp slivers.

In heat strengthening of glass sheets, heated glass sheets are conveyed out of the furnace for cooling at a faster rate than takes place with annealing such that there is a certain degree of compression at the glass surfaces but much less compression than is the case with tempered glass sheets. Such heat strengthened glass sheets have utility in laminated panels due to their ability to deform without breaking upon differential thermal expansion of the layers of these panels. Heat strengthening of glass sheets can be performed on tempering systems by conveying the heated glass sheets from the furnace through the quench unit without supplying any quenching gas or only a very small flow such that the glass surfaces are not placed in a very high state of compression upon ultimate cooling.

Glass sheets must be heated to a temperature range of about 1100 to 1200 degrees Fahrenheit (i.e. about 600 to 650 degrees Centigrade) in order to perform effective tempering or heat strengthening upon ultimate cooling. At temperatures substantially lower than this range, the glass is too viscous to permit the surfaces to be placed in compression during tempering or heat strengthening. At temperatures substantially higher than this range, the glass is too fluid to allow the tempering or heat strengthening to be performed while maintaining planarity.

U.S. Pat. Nos. 3,806,312; 3,934,970; 3,947,242; and 3,994,711 disclose glass tempering systems of the horizontal roller conveyor type for conveying glass sheets in a horizontal direction during a tempering process. Rolls in both the furnace and quench unit of each of the tempering systems disclosed by these patents are supported at their opposite ends and frictionally driven by continuous drive loops. Glass sheets supported on the upper sides of the rolls are conveyed therealong first through the furnace where heating takes place and then through the quench unit where quenching gas supplied by upper and lower blastheads provides rapid cooling of the heated glass to perform the tempering.

One conventional type of conveyor roll for quench units of horizontal roller conveyor type glass sheet tempering systems includes a central steel shaft and a flexible metallic component embodied by an all metal wire or a metallic helical spring wrapped about the shaft in a helical configuration. Such helical metallic components reduce the extent of contact with the soft heated glass sheets and also increase the exposed lower glass sheet surface area which is subjected to quenching gas as tempering is performed. In addition, the helical metallic components prevent lifting of conveyed glass sheets during tempering by facilitating the escape of spent quenching gas downwardly after impinging with the lower glass surface. Since the metallic components remain rigid at the temperature involved, the softened glass sheet can be chill cracked or marked by the helical metallic component if all of the furnace, quench unit, and and conveying parameters are not properly selected.

Other types of conveyor rolls for horizontal roller conveyor type systems for tempering and/or heat strengthening glass sheets include annular silicone rubber members received by a central steel shaft and asbestos rope wrapped helically around a central steel shaft. One problem with these types of quench rolls is that the occasional glass sheet that breaks cuts the annular silicone rubber member or the asbestos rope and the roll must then be repaired before further use. Also, the silicone rubber can leave a thin layer on the heated glass sheet if the glass temperature is too high. In attempt to overcome these problems, prior quench rolls of glass tempering systems have been provided with helical components including a central core and an outer nonmetallic covering which is a synthetic organic polymer such as silicone rubber or Teflon. The central core utilized includes metallic wire strands so as to have sufficient strength to resist cutting by broken glass.

Quench rolls for tempering relatively wide glass sheets have also included a central shaft along which glass fiber conveying discs are positioned to carry the glass during tempering. Such a quench roll construction increases the escape area for spent quenching gas supplied by a lower blasthead.

DISCLOSURE OF INVENTION

An object of the present invention is to provide an improved conveyor roll for conveying heated glass sheets. The conveyor roll disclosed in accordance with this object has particular utility for use in conveying heated glass sheets during the cooling involved with a tempering or heat strengthening process.

In carrying out the above object and other objects, a conveyor roll for conveying heated glass sheets in accordance with the present invention includes an elongated shaft having a rotational axis about which the roll is rotatively driven. A support on the shaft supports heated glass sheets conveyed on the roll during rotational driving of the roll. The support includes an outer surface of aromatic polyamide fibers which are stable at a sufficiently high temperature to support conveyed glass sheets which are heated to a temperature range of about 1100 to 1200 degrees Fahrenheit.

Each disclosed embodiment of the conveyor roll includes a support having a type of aromatic polyamide fibers sold by the E. I. duPont de Nemours & Co. (Inc.) of Wilmington, Delaware, United States of America, under its registered U.S. Trademark Kevlar. Such Kevlar fibers are sold as yarn, cloth woven from the yarn, and stable fibers in the form of felt. It has been discovered that the Kevlar fibers are stable at a sufficiently high temperature to effectively support conveyed glass sheets heated to the temperature range of about 1100 to 1200 degrees Fahrenheit required to temper or heat strengthen glass sheets. Also, the Kevlar fibers are soft so as not to mark heated glass sheets in their softened condition. Furthermore, the Kevlar fibers have sufficiently high strength to resist cutting by broken glass sheets as occasionally takes place during tempering or heat strengthening. In addition, the Kevlar fibers have low thermal conductivity so as to prevent chill cracking of the glass.

In certain embodiments disclosed, the conveyor support has an elongated shape of a generally flexible construction and is wrapped helically about the roll shaft. Such a construction provides an escape area for spent quenching gas supplied from a lower blasthead during a tempering operation performed on glass sheets conveyed on a number of the rolls through a quench unit.

Two embodiments of the helically wrapped support each comprise a braided rope of Kevlar fibers, the fibers being first made into yarn from which the rope is then braided. One embodiment of the Kevlar rope support has a generally rectangular cross section with a greater width than height so as to provide a relatively large area of support. The other embodiment of the Kevlar rope support has a generally square cross section so as to provide a greater area through which the spent quenching gas can escape downwardly. With both of these embodiments, opposite ends of the Kevlar rope are secured to the shaft in any suitable manner such as by adhesive tape.

Two other embodiments of the helically wrapped support each comprise a core and an outer sleeve made of Kevlar fibers, the fibers first being made into yarn which is then woven or braided into cloth of sleeve form. One of these embodiments includes a core having longitudinally extending strands of either metallic wire or glass fibers extending through the outer sleeve. The core of the other embodiment of the support comprises a helical spring that extends through the outer sleeve. Attachment of the opposite ends of these helical supports is provided by connection of the core to the shaft in any suitable manner.

Each of the helically wrapped embodiments of the support as described above is located between a pair of axially spaced end members on the shaft for rotatively driving the roll. These end members have round drive surfaces of the same diameter as each other and are preferably frictionally driven by a continuous drive loop in the form of a solid metal belt or a chain. Each helically wrapped Kevlar support has an outer surface defining a helix of a diameter equal to the diameter of the drive surfaces on the end members of the shaft such that the glass sheet conveyance is at the same speed as that of the drive surfaces. Such a construction facilitates transfer of the heated glass sheets between different sections of the conveyor such as between the furnace and the quench unit of a tempering system where the rolls may have different diameters. Different continuous drive loops respectively associated with the different sections of the conveyor are moved at a uniform rate of movement to engage and frictionally drive the rolls. Such driving conveys the glass sheets at a uniform rate in each section since the diameter of each roll where the glass sheet is supported is the same as the diameter at which the frictional driving takes place, and any difference in this diameter along the different conveyor sections doesn't affect the conveyance speed.

Another embodiment of the conveyor roll includes a roll shaft of a ceramic material and a support in the form of a sleeve of Kevlar fibers, the fibers first being made into yarn which is then woven or braided into cloth of sleeve form. The ceramic roll shaft extends through the Kevlar sleeve and is preferably made of fused silica which has a relatively low coefficient of thermal expansion so as to allow use of the roll immediately adjacent an exit location of an associated furnace without any thermal warping of the roll due to the heating that necessarily takes place as the glass sheets exit through an opening in the furnace onto the roll. Engagement of the Kevlar sleeve with the hot glass sheet takes place with a line contact and provides an initial slight cooling of the lower surface of each glass sheet in order to thereby slightly harden the glass and prevent subsequent marring or scratching thereof upon subsequent conveyance onto other rolls such as of the type including one of the helically wrapped Kevlar supports. The Kevlar sleeve is disclosed as being secured to the ceramic roll shaft by suitable clamps which are located adjacent a pair of axially spaced end members on the shaft for rotatively driving the roll. These end members have round drive surfaces of the same diameter as each other and the Kevlar sleeve has an outer surface of a round shape with a diameter approximately equal to the diameter of the drive surfaces such that the glass sheet conveyance is at the same speed as that of the drive surfaces.

A further embodiment of the conveyor roll includes a roll shaft that is preferably made of steel and also includes a support having a plurality of annular conveying discs spaced along with the shaft with the shaft extending therethrough in a perpendicular relationship. The elongated shaft has a rotational axis about which the roll is rotatively driven and includes a pair of axially spaced end members for rotatively driving the roll. Each of the end members has a round drive surface of the same diameter as the other one. The annular conveying discs of the support are spaced along the shaft and are made of Kevlar fibers. A round outer surface of each conveying disc is capable of supporting and conveying glass sheets which are heated to a temperature range of about 1100 to 1200 degrees Fahrenheit. The round outer surface of each conveying disc has a diameter equal to the diameter of the drive surfaces on the end members of the shaft such that the glass sheet conveyance is at the same speed as that of the drive surfaces.

The objects, features, and advantages of the present invention are readily apparent from the following detailed description of the best modes for carrying out the invention when taken in connection with the accompanying drawings.

BRIEF DESCRIPTION OF DRAWINGS

FIG. 1 is a side elevation view of a glass tempering system whose quench unit includes conveyor rolls constructed in accordance with the present invention;

FIG. 2 is a view taken along line 2—2 FIG. 1 to illustrate one of the conveyor rolls which includes an elongated support that is wrapped helically about a shaft of the roll to support conveyed glass sheets;

FIG. 3 is a partial view of one embodiment of the elongated support;

FIG. 4 is a sectional view taken along line 4—4 in FIG. 3 through the embodiment of the support thereof;

FIG. 5 is a partial view of another embodiment of the elongated support;

FIG. 6 is a sectional view taken along line 6—6 in FIG. 5 through the embodiment of the support thereof;

FIG. 13 is a view taken in the same direction as FIG. 2 but illustrating a further embodiment of the conveyor roll;

FIG. 14 is a view taken along the direction of line 14—14 in FIG. 13 to illustrate a conveying disc of the roll;

FIG. 15 is a view of the conveying disc taken along the direction of line 15-15 in FIG. 14;

FIG. 16 is a partial view taken in section through the conveying disc along the direction of line 16—16 in FIG. 14; and FIG. 17 is a partial view taken in section through the conveyor roll along the direction of line 17—17 in FIG. 13 to illustrate an alternate way of mounting the conveying discs on the roll.

BEST MODES FOR CARRYING OUT THE INVENTION

Figure 7:
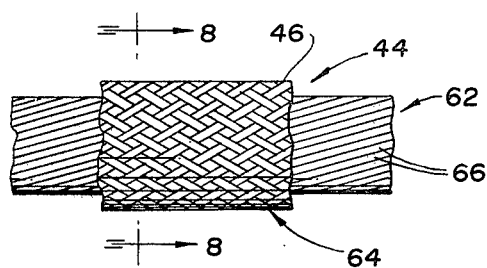
FIG. 7 is a partial view of a further embodiment of the elongated support.
Figure 8:
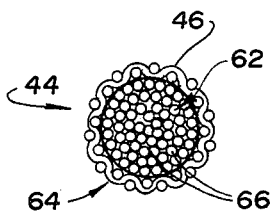
FIG. 8 is a sectional view taken along line 8—8 in FIG. 7 through the embodiment of the support thereof.
Figure 9:
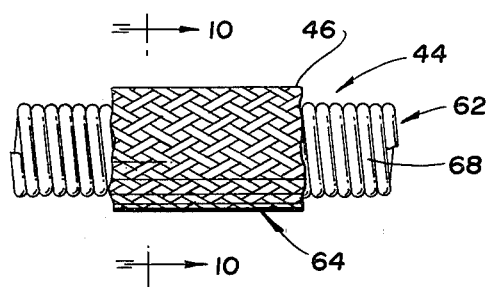
FIG. 9 is a partial view of a still further embodiment of the elongated support.
Figure 10:
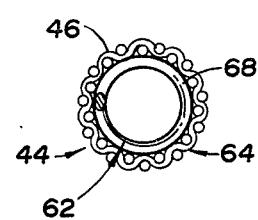
FIG. 10 is a sectional view taken along line 10—10 in FIG. 9 through the embodiment of the support thereof.

Referring to FIG. 1 of the drawings, a glass sheet tempering system collectively indicated by reference numeral 10 includes a furnace 12 in which sheets of glass G are heated while conveyed on a roller conveyor 14, and the system also includes a gas quench unit 16 for quenching the heated glass sheets G to provide tempering thereof while conveyed on a roller conveyor 18. As is more fully hereinafter described, the quench unit conveyor 18 includes conveyor rolls 20 and 21 each of which is constructed in accordance with the present invention.

Furnace conveyor 14 and quench unit conveyor 18 illustrated in FIG. 1 are generally of the type disclosed by U.S. Pat. Nos. 3,806,312; 3,934,970; 3,947,242; and 3,994,711 wherein a pair of continuous drive loops frictionally drive each conveyor. Furnace conveyor 14 includes rolls 22 whose opposite ends are respectively supported by driving reaches of a pair of continuous drive loops 24 (only one of which is shown) that are each drivingly supported by an associated pair of rotatable sheaves 26. Driving rotation of the left sheave 26 in a counterclockwise direction slidably drives the driving reach of the continuous drive loop 24 over an associated horizontal support surface 28 to frictionally drive the rolls 22 in a clockwise direction and thereby convey the glass sheet G toward the right. End pins 30 of the rolls 22 are rotatably captured within upwardly opening slots in positioners 32 mounted on the support surface 28 in order to prevent movement of the rolls toward the left or the right such that the drive loop movement imparts only rotational movement to the rolls. The driving reaches of the drive loops 24 are maintained taut such that the rolls 22 are positioned with their upper sides in a single plane in order to maintain planarity of the conveyed glass sheet G. This taut condition of the rolls can be provided by either biasing the rotational support of the right idler sheave 26 away from the left drive sheave 26 or by providing a clockwise counter-torque to the right sheave in order to pull the right end of the driving reach toward the right. Also, the furnace conveyor 14 can be driven in an oscillating manner, as disclosed by the aforementioned U.S. Pat. No. 3,994,711 if desired for the particular system.

With continuing reference to FIG. 1, the quench unit 16 includes upper and lower blastheads 34 and 36 between which the roller conveyor 18 conveys a heated sheet of glass G to be tempered. Banks of nozzles 38 of the upper blasthead 34 and banks of nozzles 40 of the lower blasthead 36 respectively supply quenching gas to the upper and lower surfaces of the glass sheet G in order to provide the rapid cooling thereof which tempers the glass. Quench unit conveyor 18 includes a friction drive mechanism similar to the furnace conveyor 14 and, as such, the like components thereof are identified by like reference numerals. Conveyor rolls 20 and 21 of the quench unit 16 are supported and frictionally driven by the associated pair of continuous drive loops 24 of the quench unit conveyor. Tempering is performed in the quench unit 16 as each glass sheet is conveyed on the conveyor rolls 20 between the quench unit nozzles 38 and 40 after having first been conveyed out of the furnace 12 on the conveyor roll 21 immediately adjacent the exit opening of the furnace.

It should also be mentioned that system 10 shown in FIG. 1 can be used to heat strengthen glass sheets as well as providing tempering. Heat strengthening is accomplished by supplying a very small flow rate of quenching gas at the quench unit 16 or none at all such that the glass is cooled by the ambient air. Heated glass sheets subjected to this processing have surfaces which are in compression a slight extent but not nearly as great as the compression involved with tempered glass sheets. Such heat strengthened glass sheets have utility in laminated glass panels due to their ability to deform without breakage upon differential thermal expansion of the layers of these panels.

Referring to FIG. 2, each conveyor roll 20 includes an elongated steel shaft 42 that extends transversely to the direction of conveyance through the quench unit and has a rotational axis about which the roll rotates during driving thereof by the associated pair of drive loops 24 in order to convey a glass sheet supported on the roll. A support 44 on the shaft 42 supports heated glass sheets conveyed on the roll 20 within the quench unit 16 during rotational driving of the roll in the manner previously described. As is hereinafter more fully described, the support 44 includes an outer surface 46 of aromatic polyamide fibers which are stable at a sufficiently high temperature to support conveyed glass sheets which are heated to a temperature range of about 1100 to 1200 degrees Fahrenheit as is required to perform tempering or heat strengthening.

With continuing reference to FIG. 2, the support 44 is elongated and has a generally flexible construction so as to be capable of being wrapped helically about the roll shaft 42. Opposite ends 48 of the helical support 44 are secured to the shaft 42 in any suitable manner such as by the adhesive tape 50 that is shown by phantom line representation. Helical support 44 is located between a pair of axially spaced end members 52 that are respectively secured on the shaft by pressed pins 54 to provide rotational driving of the roll. End members 52 have round drive surfaces 56 which are of the same diameter as each other and which rest on the pair of continuous drive loops 24 to provide the rotational driving of the roll as previously described.

FIGS. 3 through 6 illustrate two embodiments of the support 44 each of which comprises a braided rope of Kevlar fibers which are first made into yarn from which the rope is braided. The embodiment of the Kevlar rope support 44 illustrated in FIGS. 3 and 4 has a generally rectangular cross section with a greater width between its sides 58 than its height between its inner surface 60 which engages the shaft 42 and its outer surface 46 on which the conveyed glass sheets are supported. The embodiment of the Kevlar rope support 44 illustrated in FIGS. 5 and 6 has a generally square cross section defined by its lateral sides 58 and its outer and inner surfaces 46 and 60. Use of the rectangularly cross sectioned Kevlar rope support 44 illustrated in FIGS. 3 and 4 provides a greater area of support during conveyance of heated glass sheets in their softened condition, while use of the Kevlar rope support 44 illustrated in FIGS. 5 and 6 with the square cross section provides a greater area for the spent quenching gas supplied by the lower blasthead to escape downwardly after impinging with the lower surface of the heated glass sheet being conveyed on the roll.

In FIGS. 7 through 10, two additional embodiments of the helically wrapped support 44 are illustrated as each including a central core 62 and an outer sleeve 64 made of Kevlar fibers which are made into yarn from which cloth is woven or braided in sleeve form. Core 62 extends through the Kevlar sleeve 64 which defines the outer support surface 46 that engages the glass sheets upon conveyance on the roll. In the embodiment illustrated in FIGS. 7 and 8, the support 44 has a core 62 including longitudinally extending strands 66 which may comprise metallic wires or glass fibers that extend through the outer sleeve 64. The embodiment of the support 44 illustrated in FIGS. 9 and 10 includes a core 62 which comprises a helical spring 68 which extends through the sleeve 64 of Kevlar fibers.

Each of the embodiments of the helically wrapped support 44 illustrated in FIGS. 4 through 10 has a generally flexible construction in order to permit wrapping thereof in the helical shape about the roll shaft 42. The outer surface 46 of each embodiment of support 44 defines a helix of a diameter that is equal to the diameter of the drive surfaces 56 on the end members 52 of the roll. Such a construction provides glass sheet conveyance at the same speed as that of the drive surfaces 56 which are frictionally driven by the pair of continuous drive loops 24.

Figure 11:
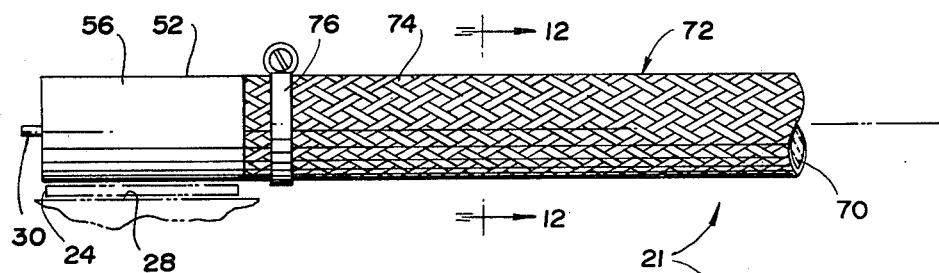
FIG. 11 is a view taken along the direction of line 11—11 in FIG. 1 to illustrate another embodiment of the conveyor roll.
Figure 12:
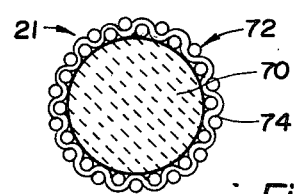
FIG. 12 is a sectional view taken along the direction of line 12—12 in FIG. 11 to illustrate the construction of the roll.

The conveyor roll 21 located immediately adjacent the furnace 12 as shown in FIG. 1 is also constructed in accordance with the present invention and is illustrated by FIGS. 11 and 12. Conveyor roll 21 has an elongated shaft 70 of a ceramic material which is preferably fused silica so as to be capable of withstanding the heat to which this conveyor roll is exposed without thermally warping. A support on the shaft 70 for supporting heated glass sheets conveyed on the roll during rotational driving thereof is provided by an outer sleeve 72 through which the ceramic shaft extends. Sleeve 72 includes an outer surface 74 of aromatic polyamide fibers which are stable at a sufficiently high temperature to support conveyed glass sheets heated to a temperature range of about 1100 to 1200 degrees Fahrenheit as is required for tempering or heat strengthening glass sheets.

Sleeve 72 of the conveyor roll 21 illustrated in FIGS. 11 and 12 is made of Kevlar fibers to provide the requisite thermal stability at the temperature involved. The Kevlar fibers are first made into yarn which is then woven or braided into cloth of sleeve form. Suitable clamps 76 secure the opposite ends of the Kevlar sleeve 72 to the ceramic roll shaft 70 just inboard from the end members 52 thereof which are secured to the opposite ends of the roll in any suitable manner. The outer surface 74 of the Kevlar sleeve 72 has a round shape of a diameter approximately equal to the diameter of the drive surfaces 56 on the end members 52 such that the glass sheet conveyance is at the same speed as the rotational speed of the drive surfaces which are frictionally driven by the movement of the continous drive loops 24 as previously described.

With reference to FIGS. 1, 11, and 12, conveyance of a heated glass sheet G out of the furnace onto the conveyor roll 21 and into the quench unit 16 provides engagement of the entire lower surface of the sheet with the outer surface 74 of the Kevlar sleeve 72. Such engagement provides a slight chilling of the lower surface of the heated glass sheet in order to provide hardening thereof which prevents marking of the glass sheet by the conveyor rolls 20 having the helically wrapped supports 44 previously described. Likewise, as previously mentioned, the ceramic material of the conveyor roll 21 also prevents thermal warping of this roll which is subjected to greater heat than the other conveyor rolls of the quench unit.

Referring to FIG. 13, another embodiment of the conveyor roll is constructed in accordance with the present invention and indicated generally by reference numeral 20'. This embodiment of the conveyor roll includes a shaft 42 and end members 52 thereon with end pins 30 of the same construction as the roll embodiment previously described in connection with FIG. 2. As such, like reference numerals are applied to like components of this conveyor roll and the previous description is applicable so that no repetition thereof is necessary.

Conveyor roll 20' shown in FIG. 13 preferably includes a roll shaft 42 made of steel and having a rotational axis about which the roll is driven. Roll 20' includes a support 80 having a plurality of conveying discs 82 spaced along the shaft 42 with the shaft extending therethrough in a perpendicular relationship. As is hereinafter more fully described, each of the conveying discs 82 is made of aromatic polyamide fibers which are stable at a sufficiently high temperature to support conveyed glass sheets heated to a temperature range of about 1100 to 1200 degrees Fahrenheit as is required to perform tempering or heat strengthening of glass sheets.

With combined reference to FIGS. 14 through 16, each conveying disc 82 has an annular shape including a central opening 84 through which the roll shaft 42 extends. An outer surface 86 of each conveying disc supports the conveyed glass sheets and has the same diameter as the diameter of the drive surfaces 56 on the roll end members 52 shown in FIG. 13 to provide support and conveyance of glass sheets at the same speed the roll is driven by the drive loops 24.

With reference to FIGS. 14 and 16, the aromatic polyamide fibers are preferably of Kevlar and are made into yarn 88 that is woven into layers of cloth. A suitable high temperature resin 89 such as a phenolic resin is utilized to bond the Kevlar cloth layers to each other. Thereafter, the opening 84 and outer surface 86 of each conveying disc 82 are machined to provide the annular shape illustrated. At the outer machined surface 86, each conveying disc 82 includes ends 90 of the Kevlar yarn where ends of the Kevlar fibers thereof provide support of the heated glass sheets during conveyance on the roll.

With reference to FIG. 13, annular clamp members are embodied by washers 92 located on the opposite sides of each conveying disc 82 with the shaft 42 extending through the washers. Thin-walled sleeves 94 of the roll have elongated shapes and are positioned between the conveying discs 82 with the shaft 42 extending through the sleeves. Opposite ends of the sleeves 94 engage the adjacent washers 92 to maintain the washers in clamping engagement with the conveying discs 82. Each washer 92 has an outer diameter sufficiently smaller than the conveying discs 82 so as not to engage the conveyed glass sheets.

Referring to FIG. 17, the clamp members may also comprise annular flanges 96 formed unitary with the sleeves 94 at each sleeve end. Shaft 42 extends through flanges 96 in the same manner as the washer type clamp members described above, and the sleeve flanges engage the conveying discs 82 to provide clamping thereof in the same general manner as the washer type clamping.

With reference back to FIG. 13, the roll 20' also includes a spring 98 that biases the sleeves 94 to clamp the conveying discs 82 in a manner that permits differential expansion of the sleeves with respect to the shaft upon heating. Thus, when the exposed sleeves 94 are heated to a higher temperature than the shielded shaft 42 by conveyance of a heated glass sheet during tempering, the sleeves are permitted to expand with respect to the shaft by deflection of the spring 98 without warpage of the roll that could disturb the planar condition of the conveyed glass sheet.

Spring 98 illustrated in FIG. 13 is preferably of the helical type with the shaft 42 extending therethrough and is located adjacent the one end of the roll 20' such that one end of the spring engages the outboard washer type clamp member 92 of the conveying disc 82 located closest to that roll end. A threaded adjuster 100 of the roll 20' engages the other end of the helical spring 98 in order to provide adjustable deflection of the spring to control the clamping force applied to the conveying discs 82. Adjuster 100 includes a first nut 102 received by a threaded portion 104 of the shaft and engaged with the spring 98 so as to permit the spring to be deflected to the extent required for applying the proper clamping force. A second nut 106 of the adjuster 100 is also received by the threaded shaft portion 104 and is torqued into engagement with the first nut 102 to lock the adjuster and thereby maintain the proper clamping force. At the roll end opposite the adjuster 100, the endmost sleeve 94 engages the inner axial end of the adjacent end member 52 to counteract the spring biasing force and thereby cooperate with the spring 98 in clamping the conveying discs 82. Provision of the spring 98 also maintains alignment of the conveying discs 82 despite any tolerance variations in their thicknesses or any tolerance variations in the thickness of the washer clamp members 92 or the machined end flanges of the sleeves 94.

The roll embodiment 20' illustrated in FIGS. 13 through 17 has particular utility when used with a quench unit to temper relatively wide glass sheets. A greater amount of spent quenching gas from the lower blasthead of the quench unit can escape sideways between the ends of the rolls with the construction illustrated since the diameter of the outer surface 86 of conveying discs 82 can be much greater than the roll diameter therebetween where the sleeves 94 are located.

While the best modes for carrying out the invention have herein been described in detail, those familiar with the art to which this invention relates will recognize various alternative designs and embodiments for carrying out the invention as defined by the following claims.

What is claimed is:

1. A conveyor roll for conveying heated glass sheets, said roll comprising: an elongated shaft having a rotational axis about which the roll is rotatively driven; a support on the shaft for supporting heated glass sheets conveyed on the roll during rotational driving thereof; and said support including an outer surface of uncoated aromatic polyamide fibers which are stable at a sufficiently high temperature to directly engage and support conveyed glass sheets which are heated to a temperature range to about 1100 to 1200 degrees Fahrenheit.

2. A conveyor roll as in claim 1 wherein the support has an elongated shape of a generally flexible construction and is wrapped helically about the roll shaft.

3. A conveyor roll as in claim 2 wherein the helically wrapped support comprises a braided rope of Kevlar fibers.

4. A conveyor roll as is claim 3 wherein the Kevlar rope has a generally rectangular cross section with a greater width than height.

5. A conveyor roll as is claim 3 wherein the Kevlar rope has a generally square cross section.

6. A conveyor roll as in claim 2 wherein the helically wrapped support comprises a core and an outer sleeve of Kevlar fibers through which the core extends.

7. A conveyor roll as in claim 6 wherein the core of the support includes longitudinally extending strands.

8. A conveyor roll as in claim 7 wherein the strands of the core comprise metallic wires.

9. A conveyor roll is in claim 7 wherein the strands of the core comprise glass fibers.

10. A conveyor roll as in claim 6 wherein the core of the support comprises a helical spring.

11. a conveyor roll as in claim 1 wherein the roll shaft is of a ceramic material and wherein the support comprises a sleeve of Kevlar fibers through which the roll shaft extends.

12. A conveyor roll is in claim 1 wherein the support comprises a plurality of annular conveying discs spaced along the shaft with the shaft extending therethrough in a perpendicular relationship.

13. Apparatus as in claim 1 wherein the aromatic polyamide fibers are Kevlar fibers.

14. A conveyor roll for conveying heated glass sheets, said roll comprising: an elongated shaft having a rotational axis about which the roll is rotatively driven; a support on the shaft for supporting heated glass sheets conveyed on the roll during rotational driving thereof;

and said support including an outer surface of uncoated Kevlar fibers to thereby permit direct engagement and support of conveyed glass sheets which are heated to a temperature range of about 1100 to 1200 degrees Fahrenheit.

15. A conveyor roll for conveying heated glass sheets, said roll comprising: an elongated shaft having a rotational axis about which the roll is rotatively driven; a pair of axially spaced end members on the shaft for rotatively driving the roll; said end members having round drive surfaces of the same diameter as each other; an elongated support of a generally flexible construction wrapped helically about the shaft to support heated glass sheets conveyed on the roll during rotational driving thereof; said support including uncoated Kevlar fibers braided into a rope having an outer surface of uncoated Kevlar fibers that are capable of directly engaging and supporting conveyed glass sheets which are heated to a temperature range of about 1100 to 1200 degrees Fahrenheit; and said outer surface of the Kevlar rope defining a helix of a diameter equal to the diameter of the drive surfaces on the end members of the shaft such that the glass sheet conveyance is at the same speed as that of the drive surfaces.

16. A conveyor roll for conveying heated glass sheets, said roll comprising: an elongated shaft having a rotational axis about which the roll is rotatively driven; a pair of axially spaced end members on the shaft for rotatively driving the roll; said end members having round drive surfaces of the same diameter as each other; an elongated support of a generally flexible construction wrapped helically about the about the shaft to support heated glass sheets conveyed on the roll during rotational driving thereof; said support including a core having longitudinally extending strands; the support also including an outer sleeve of uncoated Kevlar fibers through which the core extends; said Kevlar sleeve having an outer surface of uncoated Kevlar fibers that are capable of directly engaging and supporting conveyed glass sheets which are heated to a temperature range of about 1100 to 1200 degrees Fahrenheit; and said outer surface of the Kevlar sleeve defining a helix of a diameter equal to the diameter of the drive surfaces on the end members of the shaft such that the glass sheet conveyance is at the same speed as that of the drive surfaces.

17. A conveyor roll for conveying heated glass sheets, said roll comprising: an elongated shaft having a rotational axis about which the roll is rotatively driven; a pair of axially spaced end members on the shaft for rotatively driving the roll; said end members having round drive surfaces of the same diameter as each other; an elongated support of a generally flexible construction wrapped helically about the shaft to support heated glass sheets conveyed on the roll during rotational driving thereof; said support including a core having a helical spring; the support also including an outer sleeve of uncoated Kevlar fibers through which the core extends; said Kevlar sleeve having an outer surface of uncoated Kevlar fibers that are capable of directly engaging and supporting conveyed glass sheets which are heated to a temperature range of about 1100 to 1200 degrees Fahrenheit; and said outer surface of the Kevlar sleeve defining a helix of a diameter equal to the diameter of the drive surfaces on the end members of the shaft such that the glass sheet conveyance is at the same speed as that of the drive surfaces.

18. A conveyer roll for conveying heated glass sheets, said roll comprising: an elongated shaft of fused silica having a rotational axis about which the roll is rotatively driven; a pair of axially spaced end members on the shaft for rotatively driving the roll; said end members having round drive surfaces of the same diameter as each other; a support on the shaft between said end members for supporting heated glass sheets conveyed on the roll during rotational driving thereof; said support being a sleeve of uncoated Kevlar fibers through which the shaft extends; said Kevlar sleeve having an outer surface of uncoated Kevlar fibers capable of directly engaging and supporting conveyed glass sheets heated to a temperature range of about 1100 to 1200 degrees Fahrenheit; and said outer surface of the Kevlar sleeve having a round shape of a diameter approximately equal to the diameter of the drive surfaces on the end members of the shaft such that the glass sheet conveyance is at the same speed as that of the drive surfaces.

19. A conveyor roll for conveying heated glass sheets, said roll comprising: an elongated shaft having a rotational axis about which the roll is rotatively driven; a pair of axially spaced end members on the shaft for rotatively driving the roll; said end members having round drive surfaces of the same diameter as each other; a support including a plurality of annular conveying discs spaced along the shaft with the shaft extending therethrough in a perpendicular relationship; said conveying discs each being made of uncoated Kevlar fibers and including a round outer surface of uncoated Kevlar fibers that are capable of directly engaging and supporting conveyed glass sheets which are heated to a temperature range of about 1100 to 1200 degrees Fahrenheit; and the round outer surface of each conveying disc having a diameter equal to the diameter of the drive surfaces on the end members of the shaft such that the glass sheet conveyance is at the same speed as that of the drive surfaces.

20. In hot glass sheet handling apparatus including a generally rigid member, the improvement comprising: a support on the rigid member having an outer surface of uncoated aromatic polyamide fibers which are stable at a sufficiently high temperature to directly engage and support glass sheets heated to a temperature of about 1100 to 1200 degrees Fahrenheit.

* * * * *

UNITED STATES PATENT AND TRADEMARK OFFICE
CERTIFICATE OF CORRECTION

PATENT NO. : 4,421,482
DATED : December 20, 1983
INVENTOR(S) : Ronald A. McMaster It is certified that error appears in the above-identified patent and that said Letters Patent is hereby corrected as shown below:

Column 2, line 23, after "unit", delete "and".

Column 4, line 67, after "2-2", insert -- of --.

Column 10, line 31, Claim 1, after "range" delete "to" and insert -- of --.

Column 10, line 38, Claim 4, "is" should read -- in --.

Column 10, line 41, Claim 5, "is" should read -- in --.

Column 10, line 50, Claim 9, "is" should read -- as --.

Column 10, line 54, Claim 11, "a" should read -- A --.

Column 10, line 58, Claim 12, "is" should read -- as --.

Column 11, line 32, Claim 16, after "helically" delete "about the", first occurrence.

Signed and Sealed this

Fifth Day of June 1984

[SEAL]

Attest:

GERALD J. MOSSINGHOFF

Attesting Officer    Commissioner of Patents and Trademarks